(12) United States Patent
Chakrabarti et al.

(10) Patent No.: US 7,800,331 B2
(45) Date of Patent: Sep. 21, 2010

(54) METHOD AND SYSTEM FOR OPERATING AN ELECTRIC MOTOR COUPLED TO MULTIPLE POWER SUPPLIES

(75) Inventors: Sibaprasad Chakrabarti, Torrance, CA (US); Brian A. Welchko, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 483 days.

(21) Appl. No.: 11/945,368

(22) Filed: Nov. 27, 2007

(65) Prior Publication Data

US 2009/0134828 A1 May 28, 2009

(51) Int. Cl.
 *H02P 1/00* (2006.01)
(52) U.S. Cl. .................. 318/440; 318/105; 318/722; 318/801; 363/71
(58) Field of Classification Search .......... 318/105, 318/440, 722, 801; 363/40, 41, 59, 65, 71
See application file for complete search history.

(56) References Cited

U.S. PATENT DOCUMENTS

| | | | |
|---|---|---|---|
| 5,016,158 A * | 5/1991 | Matsui et al. | 363/71 |
| 5,657,217 A * | 8/1997 | Watanabe et al. | 363/71 |
| 6,242,884 B1 * | 6/2001 | Lipo et al. | 318/808 |
| 6,510,063 B2 * | 1/2003 | Kobayashi et al. | 363/41 |
| 7,154,237 B2 | 12/2006 | Welchko et al. | |
| 7,199,535 B2 | 4/2007 | Welchko et al. | |
| 7,294,984 B2 * | 11/2007 | Urakabe et al. | 318/378 |
| 7,439,697 B2 * | 10/2008 | Miyazaki et al. | 318/400.41 |

OTHER PUBLICATIONS

Corzine, K. A. et al., "Performance Characteristics of a Cascaded Two-Level Converter," IEEE Transactions on Energy Conversion, 1999, pp. 433-439, vol. 14, No. 3.
Kim, J. et al., "Dual-Inverter Control Strategy for High-Speed Operation of EV Induction Motors," IEEE Transactions on Industrial Electronics, 2004, pp. 312-320, vol. 51, No. 2.
Shivakumar, E. G. et al., "A Multi Level Space Phasor Based PWM Strategy for an Open-End Winding Induction Motor Drive Using Two Inverters with Different DC Link Voltages," In Proceedings 4th IEEE International Conference on Power Electronics and Drive Systems, 2001, pp. 169-175, vol. 1.

* cited by examiner

*Primary Examiner*—Bentsu Ro
*Assistant Examiner*—Thai Dinh
(74) *Attorney, Agent, or Firm*—Ingrassia Fisher & Lorenz, P.C.

(57) ABSTRACT

Methods and systems are provided for operating an electric motor having at least one winding coupled to first and second power supplies. A torque command for the electric motor is received. A present power reserve for the first and second power supplies is determined based at least in part on the torque command. An operating voltage for the second power supply is determined based on the present power reserve. The operating voltage for the second power supply is applied to the at least one winding. The application of the operating voltage allowing the present power reserve to flow between the first and second power supplies and the motor.

20 Claims, 5 Drawing Sheets

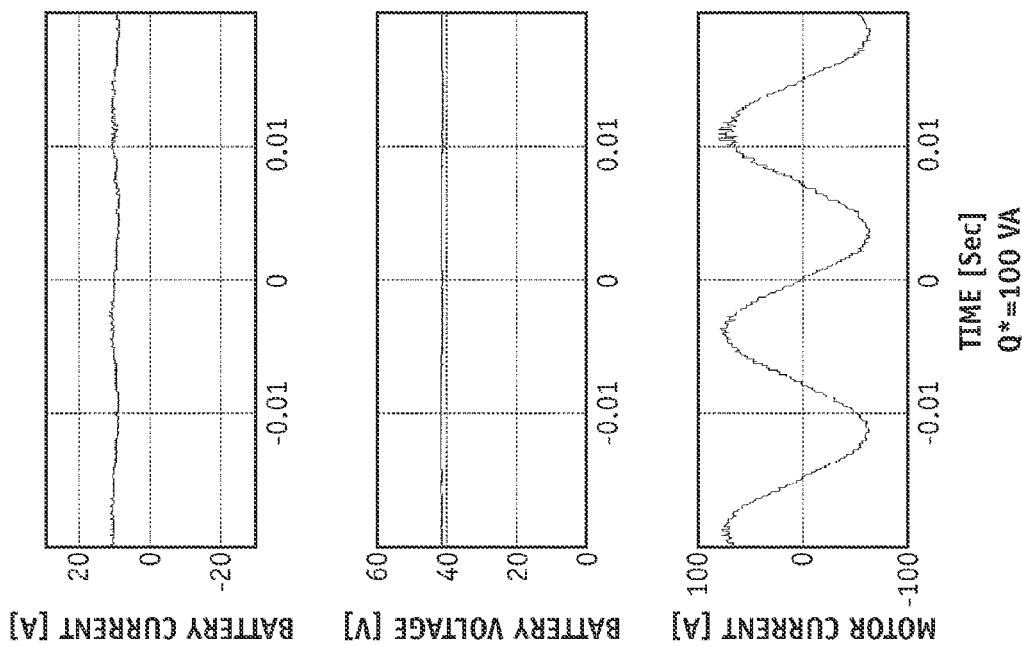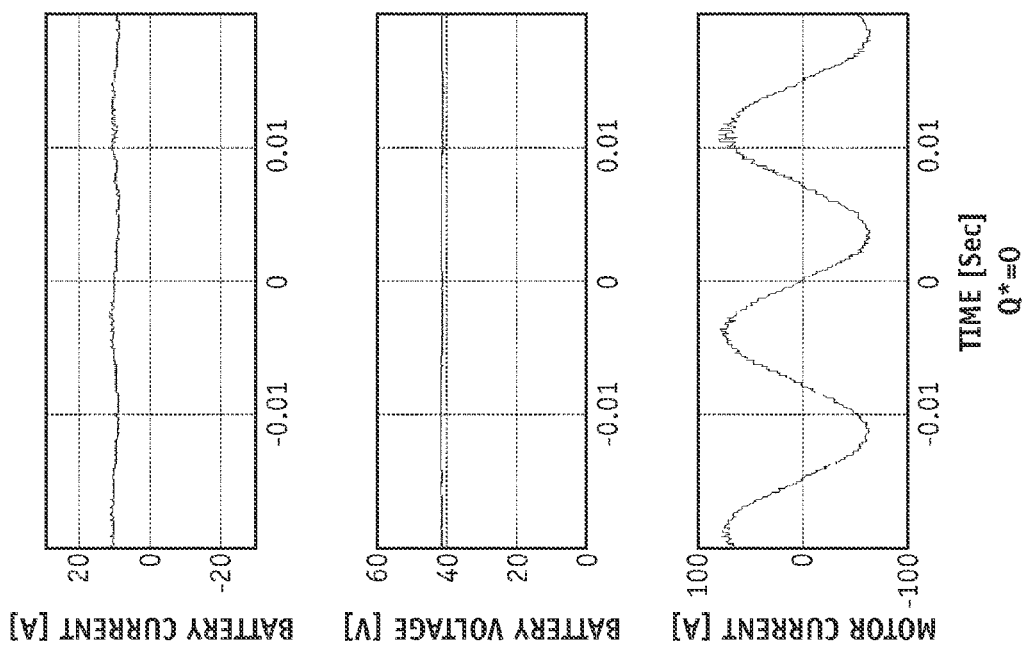

METHOD AND SYSTEM FOR OPERATING AN ELECTRIC MOTOR COUPLED TO MULTIPLE POWER SUPPLIES

TECHNICAL FIELD

The present invention generally relates to electric motors, and more particularly relates to a method and system for operating an electric motor coupled to multiple power supplies.

BACKGROUND OF THE INVENTION

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Additionally, such vehicles, particularly fuel cell vehicles, often use two separate voltage sources (e.g., a battery and a fuel cell) to power the electric motors that drive the wheels. "Power converters," such as direct current-to-direct current (DC/DC) converters, are typically used to manage and transfer the power from the two voltage sources. Modern DC/DC converters often include transistors electrically interconnected by an inductor. By controlling the states of the various transistors, a desired average current can be impressed through the inductor and thus control the power flow between the two voltage sources.

The utilization of both a power inverter and a power converter greatly increases the complexity of the electrical system of the automobile. The additional components required for both types of devices also increase the overall cost and weight of the vehicle.

Accordingly, it is desirable to provide a system and method for operating a motor coupled to multiple power sources which utilizes a simplified electrical system while maximizing the performance of the motor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for operating an electric motor having at least one winding coupled to first and second power supplies. A torque command for the electric motor is received. A present power reserve for the first and second power supplies is determined based at least in part on the torque command. An operating voltage for the second power supply is determined based on the present power reserve. The operating voltage for the second power supply is applied to the at least one winding. The application of the operating voltage allows the present power reserve to flow between at least two of the first power supply, the second power supply, and the motor.

A method is provided for operating an electric motor having at least one winding with a first direct current (DC) power supply and a first power inverter coupled to a first end thereof and a second DC power supply and a second power inverter coupled to a second end thereof is provided. A torque command for the electric motor is received. A power command for the first DC power supply is determined based on the torque command. The power command for the first DC power supply is one of less than a maximum power output of the first DC power supply and not less than the maximum power output of the first DC power supply. A power command for the second DC power supply is determined based on a difference between the power command for the first DC power supply and the maximum power output of the first DC power supply. An operating voltage for the second DC power supply is determined based on the power command for the second DC power supply. The operating voltage for the second DC power supply is applied to the at least one winding with the second power supply.

An automotive drive system is provided. The automotive drive system includes an electric motor having at least one winding, first and second direct current (DC) power supplies coupled to the at least one winding, first and second power inverters coupled between the respective first and second DC power supplies and the at least one winding to receive power from the first and second DC power supplies and provide alternating current (AC) power to the electric motor, and a processor in operable communication with the electric motor, the first and second DC power supplies, and the first and second power inverters. The processor is configured to determine a present power reserve for the first and second DC power supplies based at least in part on a torque command for the electric motor, determine an operating voltage for the second DC power supply based on the present power reserve, and operate the second power inverter to apply the operating voltage for the second power supply to the at least one winding with the second power supply.

DESCRIPTION OF THE DRAWINGS

The present invention will hereinafter be described in conjunction with the following drawing figures, wherein like numerals denote like elements.

FIGS. 6-11 are graphical illustrations of experimental results of operation of the system and/or method of FIG. 5

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-11 are merely illustrative and may not be drawn to scale.

FIG. 1 to FIG. 11 illustrate a method and system for operating an electric motor having at least one winding coupled to first and second power supplies. A torque command for the electric motor is received, and a present power reserve for the first and second power supplies is determined based at least in part on the torque command. An operating voltage for the second power supply is determined based on the present power reserve. The operating voltage (i.e., alternating current (AC)) for the second power supply is applied to the at least one winding. The application of the operating voltage allows the present power reserve to flow between at least two of the first and second power supplies and the motor.

Figure 1:
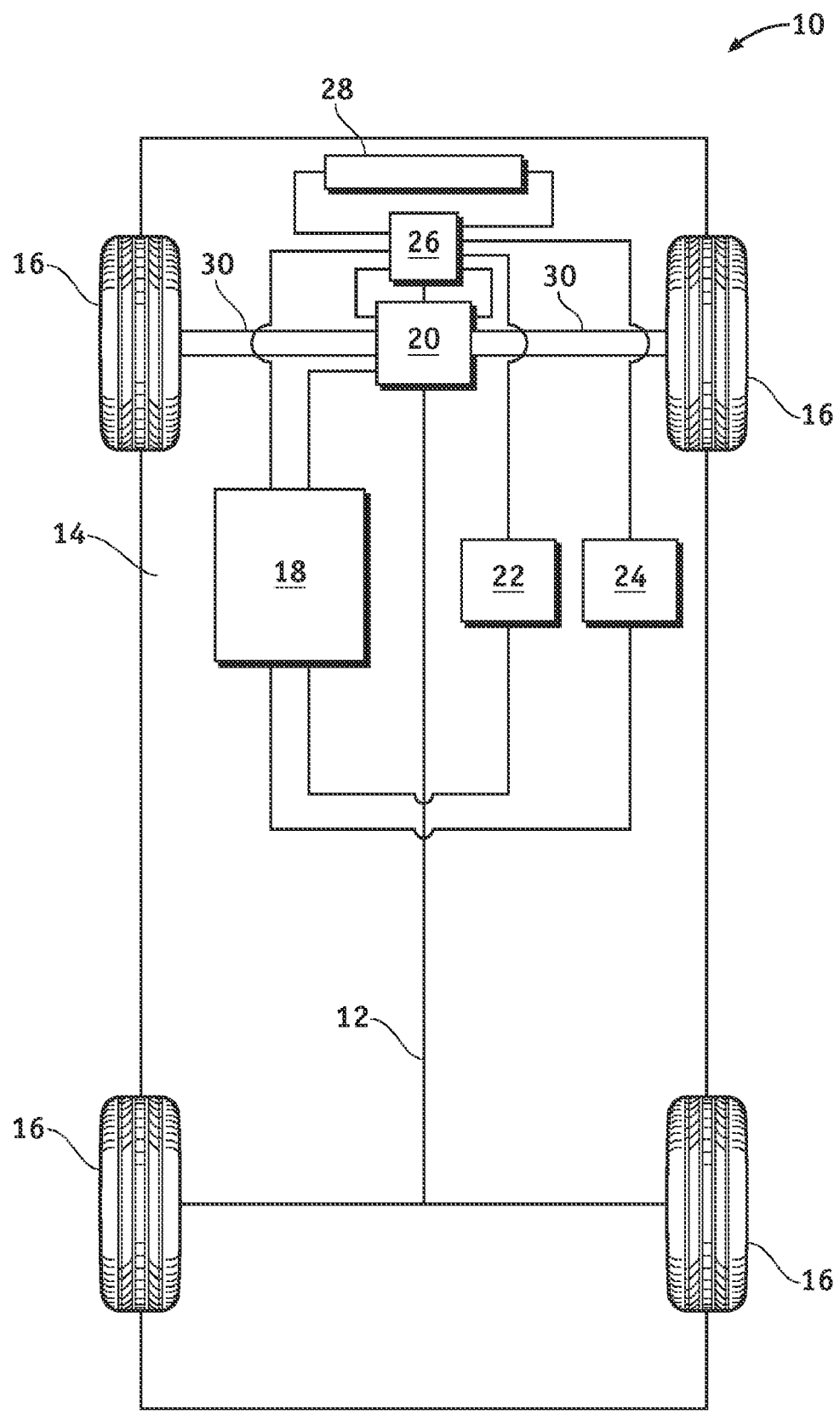
FIG. 1 is a schematic view of an exemplary automobile, according to one embodiment of the present invention.

FIG. 1 illustrates a vehicle, or automobile 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 10 is a fuel cell vehicle, and further includes an electric motor/generator (or "traction" motor) 20, a fuel cell power module (FCPM) 22, a battery 24, a power inverter assembly 26, and a radiator 28. It should also be noted that the automobile 10, in the depicted embodiment, does not include a direct current-to-direct current (DC/DC) power converter.

As shown, the FCPM 22 and the battery 24 are in operable communication and/or electrically connected to the electronic control system 18 and the power inverter assembly 26. Although not illustrated, the FCPM 22, in one embodiment, includes among other components, a fuel cell having an anode, a cathode, an electrolyte, and a catalyst. As is commonly understood, the anode, or negative electrode, conducts electrons that are freed from, for example, hydrogen molecules so that they can be used in an external circuit. The cathode, or positive electrode, conducts the electrons back from the external circuit to the catalyst, where they can recombine with the hydrogen ions and oxygen to form water. The electrolyte, or proton exchange membrane, conducts only positively charged ions while blocking electrons, while the catalyst facilitates the reaction of oxygen and hydrogen.

Figure 2:
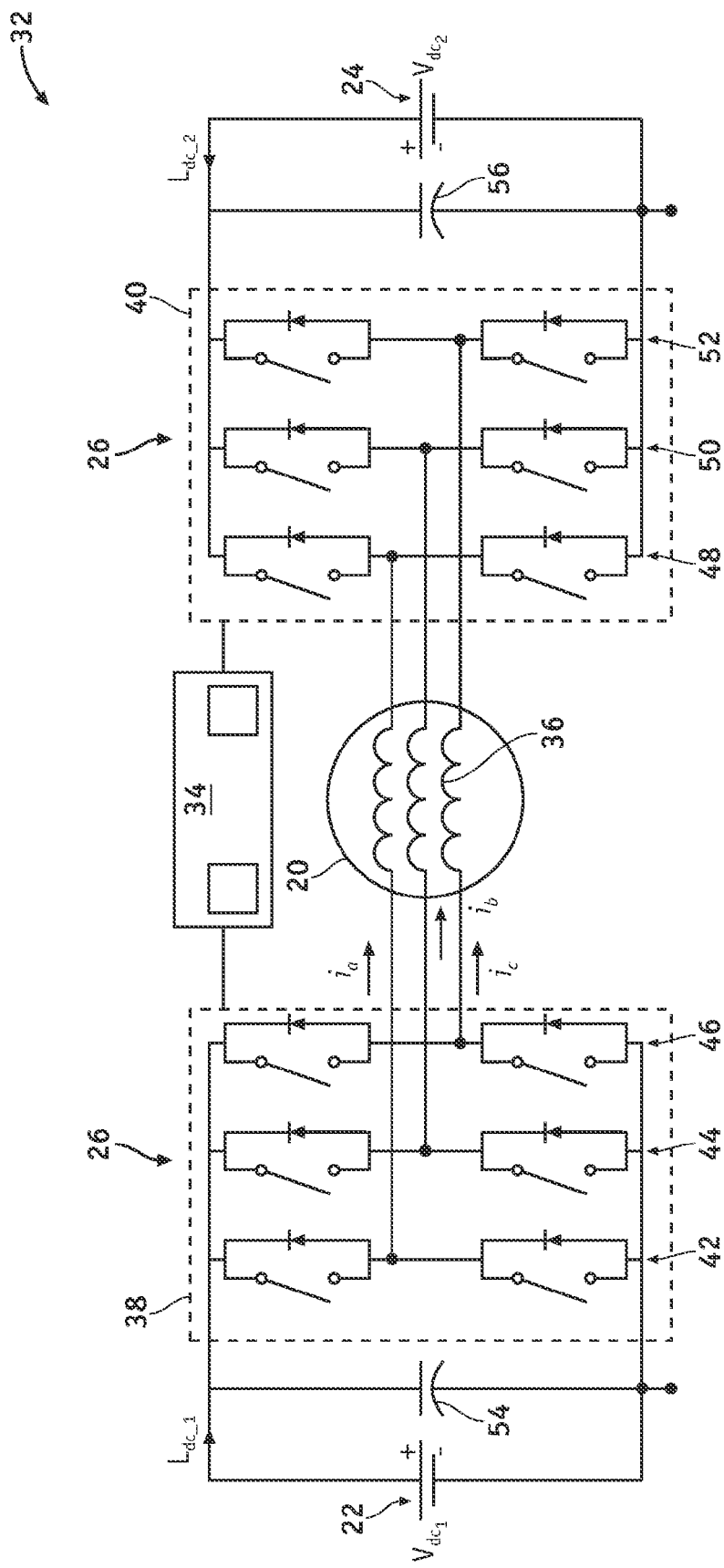
FIG. 2 is a schematic view of a dual inverter, open winding motor system within the automobile of FIG. 1.

FIG. 2 schematically illustrates a dual inverter, open winding motor system 32 within the automobile 10 illustrated in FIG. 1. The system 32 includes the motor 20, the FCPM (or first voltage or power source) 22, the battery 24 (or second voltage or power source), the inverter assembly 26, and a controller 34.

The motor 20, in one embodiment, is a three-phase alternating current (AC) motor and includes three windings (or coils) 36, each corresponding to one phase of the motor 20, as is commonly understood. In one embodiment, the neutral point of the motor 20 is opened up to make it a six terminal, three-phase motor. Although not illustrated, the motor 20 includes a stator assembly (including the coils), a rotor assembly (including a ferromagnetic core), and a cooling fluid (i.e., coolant), as will be appreciated by one skilled in the art. As shown in FIG. 1, the motor 20 may also include a transmission integrated therein such that the motor 20 and the transmission are mechanically coupled to at least some of the wheels 16 through one or more drive shafts 30.

Referring again to FIG. 2, the inverter assembly 26 includes first and second inverter sections (or inverters) 38 and 40, each including six switches (e.g., semiconductor devices, such as transistors and/or switches) with antiparallel diodes (i.e., antiparallel to each switch). As shown, the switches in the sections 38 and 40 are arranged into three pairs (or legs), with pairs 42, 44, and 46 being in the first section 38 and pairs 48, 50, and 52 being in the second section 40. A first of the windings 36 of the motor 20 is electrically connected, at opposing ends thereof, between the switches of switch pair 42 in the first section and 48 in the second section. A second of the windings 36 is connected between the switches of pair 44 in the first section and 50 of the second section. A third of the windings 36 is connected between the switches of pairs 46 and 52.

Still referring to FIG. 2, the system 32 also includes first and second capacitors 54 and 56 respectively connected in parallel with the first and second power sources 22 and 24 to smooth current ripple during operation. The controller 34 is in operable communication and/or electrically connected to the first and second inverter sections 38 and 40. The controller 34 is responsive to commands received from the driver of the automobile 10 (i.e. via an accelerator pedal) and provides commands to the first section 38 and the second section 40, as will be described, to control the output of the sections 38 and 40. High frequency pulse width modulation (PWM) may be employed to control the sections 38 and 40 and manage the voltage produced by the sections 38 and 40.

Referring again to FIG. 1, the electronic control system 18 is in operable communication with the motor 20, the fuel cell 22, the battery 24, and the inverter assembly 26. Although not shown in detail, the electronic control system 18 includes various sensors and automotive control modules, or electronic control units (ECUs), such as an inverter control module (i.e., the controller 34 shown in FIG. 2) and a vehicle controller, and at least one processor and/or a memory which includes instructions stored thereon (or in another computer-readable medium) for carrying out the processes and methods as described below.

Referring again to FIG. 1, the radiator 28 is connected to the frame at an outer portion thereof and although not illustrated in detail, includes multiple cooling channels therethrough that contain a cooling fluid (i.e., coolant), such as water and/or ethylene glycol (i.e., "antifreeze), and is coupled to the inverter assembly 26 and the motor 20. In one embodiment, the inverter 26 receives and shares coolant with the electric motor 20.

During operation, still referring to FIG. 1, the automobile 10 is operated by providing power to the wheels 16 with the electric motor 20 which receives power from the FCPM 22 and the battery 24 in an alternating manner and/or with the FCPM 22 and the battery 24 simultaneously. In order to power the motor 20, DC power is provided from the FCPM 22 and the battery 24 to the first and second inverters 38 and 40 respectively, which convert the DC power into AC power, as is commonly understood in the art. As is described below, if the motor 20 does not require the maximum power output of the FCPM 22, the extra power from the FCPM 22 may be used to charge the battery 24. If the motor 20 requires both the maximum power output of the FCPM 22, as well as power from the battery 24, power from the battery 24 may be used in combination with the FCPM 22 to operate the motor 20.

Figure 3:
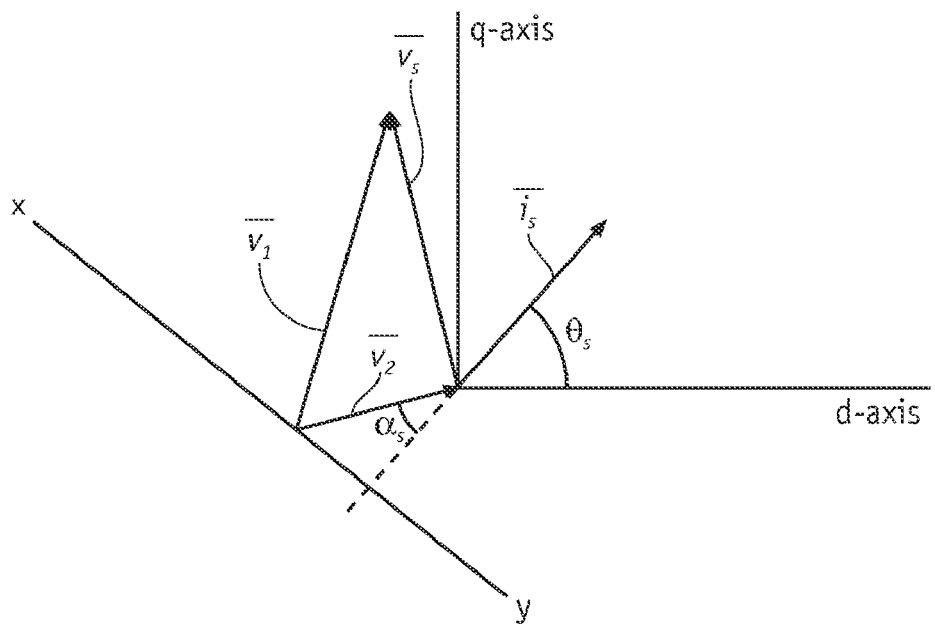
FIG. 3 is a phasor diagram of illustrating operation the system of FIG. 2 in accordance with one embodiment of the present invention.
Figure 4:
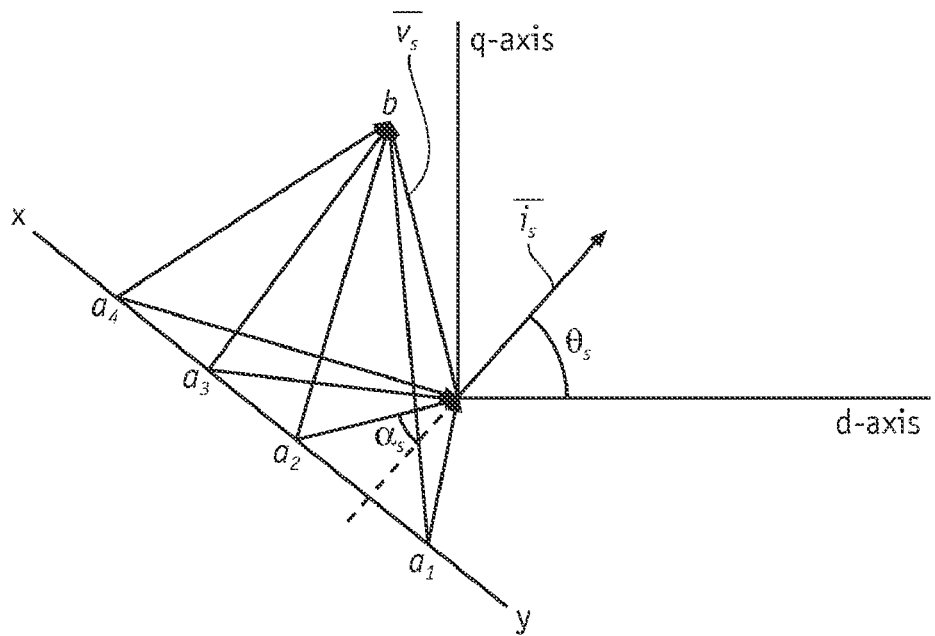
FIG. 4 is a phasor diagram further illustrating the operation of FIG. 3.

Referring to FIGS. 3 and 4, in combination with FIG. 2, the first and second inverters 38 and 40 produce AC voltages across the windings 36 (or phases) at both ends. The produced AC phase voltages from the first and second inverters 38 and 40 are represented by the voltage phasors $\overline{v_1}$ and $\overline{v_2}$ respectively. The phase voltage across the motor terminal may be expressed as following:

$$\overline{v_s} = \overline{v_1} - \overline{v_2} \quad (1)$$

As is commonly understood, the required voltages across the windings 36 of the motor 20 (FIG. 2), which are represented by the voltage phasor $v^*_s$, are dependent on the speed, commanded torque (i.e., commanded synchronous frame currents), and other motor parameters. One such operating condition is represented by current vector $\overline{i_s}$ and voltage vector $\overline{v_s}$ in FIG. 3.

During the operation of the motor 20, the first voltage source 22 (e.g., the FCPM) may have the capability to deliver an excess amount of power (i.e., reserve power), in addition to the power required by the motor 20 to produce the commanded torque. This excess power may be supplied to and stored by the second voltage source 24 (e.g., the battery) and may be considered a negative DC current in the voltage bus of the second voltage source 24 because of the indicated directions of current flow shown in FIG. 2. The reserve power may be understood to be the difference between the power required by the motor 20 and the maximum power output of the FCPM 22. Under some operating conditions, the maximum power output of the FCPM 22 may be less than the power required by the motor 20.

A constant power line xy that represents this excess power is shown in FIGS. 3 and 4 on which active power may be represented as $P=3|\overline{v_2}||\overline{i_s}|\cos\alpha_s$ and reactive power may be represented as $Q=-3|\overline{v_2}||\overline{i_s}|\sin\alpha_s$. An AC voltage vector $\overline{v_2}$, produced by the second inverter 40 with the second voltage source 24 and originating on the xy line, along with the AC current vector $\overline{i_s}$, represents the excess power that flows into the second voltage source 24. Therefore, the first inverter 38 and the first voltage source 22 are required to produce a voltage vector $\overline{v_1}$ as AC voltage so that the desired motor voltage represented by vector $\overline{v_s}$ is maintained.

As shown in FIG. 4, many combinations of $\overline{v_1}$ and $\overline{v_2}$ satisfy the same motor voltage and same active power as in FIG. 3. These combinations are represented by points $a_1, a_2, a_3,$ and $a_4$ on the xy line. The various vectors represent different inverter/voltage source voltages, all of which produce the same torque in the motor 20 and the same power flow to (or from) the second voltage source 24. The optimal operating point on this constant power line xy decides the modulating voltage across the terminals of the second inverter 40.

It should be noted that the first voltage source 22 may not produce enough power to supply the required motor torque. In such a situation, the second voltage source 24 supplies the additional power (i.e., negative reserve power) that is required.

Figure 5:
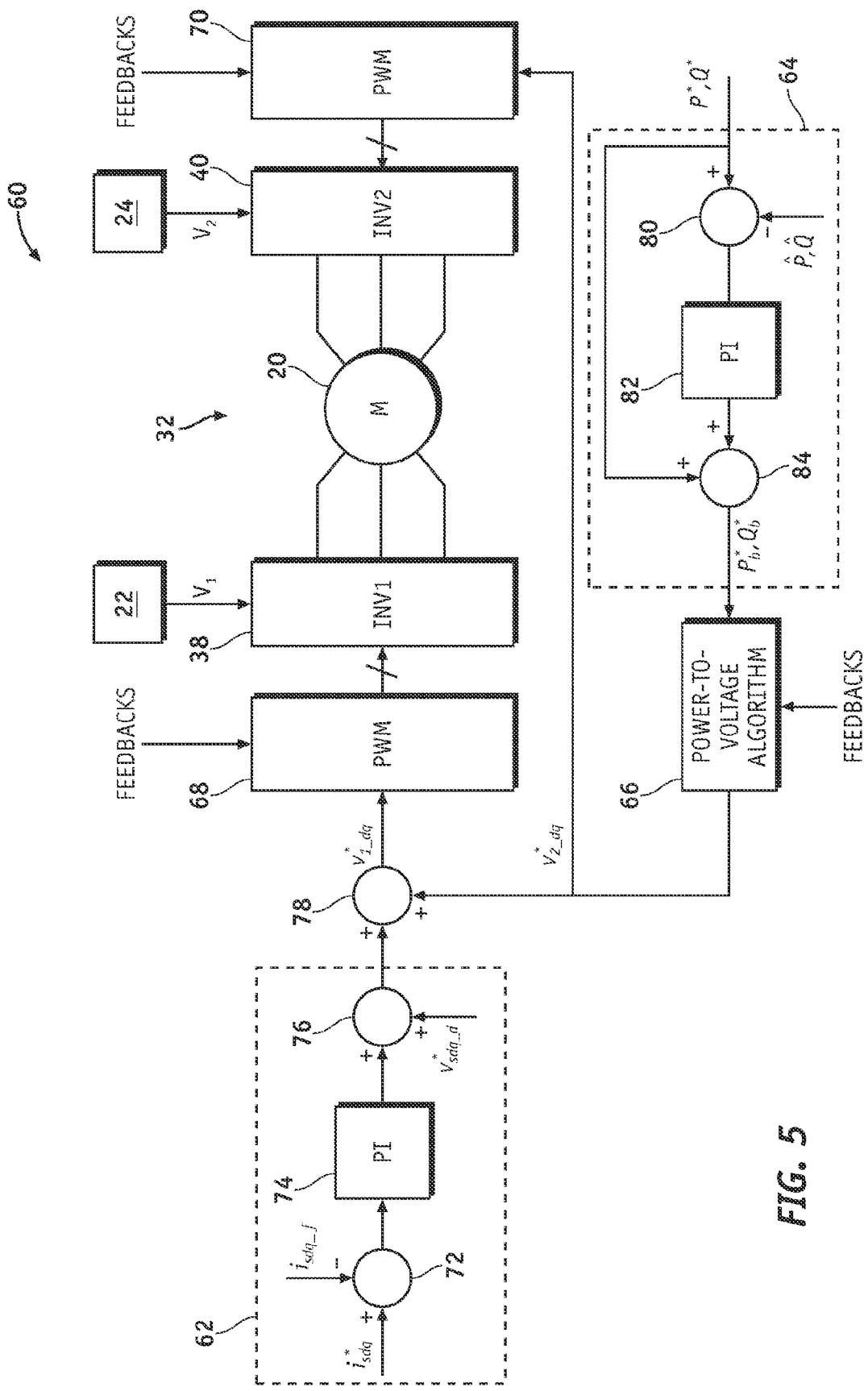
FIG. 5 is a block diagram of a system and/or method for operating the motor system of FIG. 2.

FIG. 5 illustrates a system (and/or method) 60 for operating a motor in a dual inverter system utilizing the principles described above in accordance with one embodiment of the present invention. The system and/or method 60 includes a current control block 62, a power control block 64, a power-to-voltage conversion block 66, first and second PWM blocks 68 and 70, and the dual inverter system 32. The system and/or method 60 provides a control algorithm that achieves power flow control between the first and second voltage sources 22 and 24 while producing the commanded torque inside the motor 20. Although not shown, the system 60 receives a torque command for the motor 20 from which a power command for the first voltage source 22 (and/or the first inverter 38), as well as synchronous frame currents for the windings 36 within the motor 20 may be generated.

Within the current control block 62, a synchronous frame commanded current $i^*_{sdq}$ and a feedback (i.e., measured) current $i_{sdq\_f}$ are received by summation circuit (or summer) 72. The summation circuit 72 calculates a difference (i.e., error) between the commanded current and the feedback current. The error is sent to, for example, a first proportional integral, or integration, (PI) controller 74.

As will be appreciated by one skilled in the art, the first PI controller 74 is a feedback loop component that takes a measured value (or output) from a process or other apparatus and compares it with a set, or reference, value. The difference (or "error" signal) is then used to adjust an input to the process in order to bring the output to its desired reference value. The first PI controller 74 may include a proportional and an integral term. The proportional term is used to account for the "immediate" or present error, which is multiplied by a constant. The integral term integrates the error over a period of time and multiplies the integrated sum by another constant.

As such, the first PI controller 74 receives the present current error from summation circuit 72 and generates a signal that is representative of a combination of the present current error and the current error over a period of time. The output of the first PI controller 74 is sent to summation circuit 76, which also receives, in one embodiment, the decoupling voltage $v^*_{sdq\_d}$. The summation circuit 76 adds the output of the first PI controller 74 to the decoupling voltage and sends its output (i.e., a voltage signal) to summation circuit 78.

Within the power control block 64, summation circuit 80 receives commanded active and reactive powers P*, Q* and feedback (i.e., measured), or estimated, active and reactive powers $\hat{P}$, $\hat{Q}$. Ideally, active power calculated in the AC side should match with that in the DC side. However, non-ideal characteristics of the power circuits and their operations always result into a mismatch between them. In embodiments in which the accountability of a small amount of power (especially active power) is important, an algorithm to estimate power in the absence of proper sensors may be used to improve the accuracy of the commanded power.

These estimated powers can then be used as feedback ($\hat{P}$, $\hat{Q}$) to a closed loop power regulator as shown in FIG. 5. This estimation may be simplified if a DC side current sensor is used to measure the DC side current. This measured DC current, along with measured DC voltage, may then be used to calculate instantaneous active power, which may improve the accuracy of the regulation of the active power. The commanded active and reactive powers $P^*_b$ and $Q^*_b$ out of the power control block 64 in FIG. 5 may be used in place of p* and q* respectively in Equations 7 and 8 for calculating the modulating voltages as described below.

In one embodiment, the active and reactive powers, or power commands, P*, Q* may actually correspond to commanded powers for the second voltage source 24 (and/or the second inverter 40), which may be determined by calculating a difference between the power command for the first voltage source 22 and the maximum power output of the first voltage source 22. As such, the power commands P*, Q* may be positive or negative, depending on there being a surplus or shortage of power in the first voltage source 22.

The summation circuit 80 calculates a difference (i.e., error) between the commanded active and reactive powers and the feedback active and reactive powers. The error is sent to a second PI controller 82, which may be similar to the first PI controller 74 described above.

The second PI controller 82 generates a signal that is representative of a combination of the present active/reactive power error and the active/reactive power error over a period of time. The output of the second PI controller 82 is sent to summation circuit 84, which also receives, in one embodiment, the commanded active and reactive powers P*, Q* Summation circuit 84 adds the signal from the second PI controller 82 to the commanded powers and sends modified commanded active and reactive powers $P^*_b$, $Q^*_b$ to the power-to-voltage conversion block 66.

The power-to-voltage conversion block 66 uses the modified commanded active and reactive powers, along with appropriate feedback signals, to generate a voltage command for the second inverter 40, as discussed below.

The instantaneous active and reactive power may be expressed mathematically as a function of voltages and currents in the synchronous frame as following:

$$\begin{bmatrix} p \\ q \end{bmatrix} = \begin{bmatrix} i_d & i_q \\ i_q & -i_d \end{bmatrix} \begin{bmatrix} v_d \\ v_q \end{bmatrix} \quad (2)$$

where $v_d$ and $v_q$ are synchronous frame voltages and $i_d$ and $i_q$ are synchronous frame currents. For illustrative purposes, it is assumed that the first voltage source 22 produces excess power in addition to the traction power that is required to produce the commanded torque. It is preferable to have this excess power needs flow into the second voltage source (i.e., the battery) 24 so that it can be stored for later use. In such a situation, if p and q are the active and reactive powers delivered to the second inverter 40, the synchronous frame voltages and currents in the above equation represent the terminal quantities at the second inverter 40.

The three phase AC currents are determined by the torque developed inside the motor 20 and are regulated by the current control block 62. That is, for a given torque command, the AC current inside the motor is predetermined and the synchronous frame currents in Equation 2 are completely governed by the current control block 62. A set of synchronous frame voltages $v_d$ and $v_q$ needs to be maintained at the second inverter 40 terminals for a given torque command and a given power flow. These voltages in Equation 2 may be expressed as:

$$\begin{bmatrix} v_d \\ v_q \end{bmatrix} = \begin{bmatrix} i_d & i_q \\ i_q & -i_d \end{bmatrix}^{-1} \begin{bmatrix} p \\ q \end{bmatrix} \quad (3)$$

The power delivered to the motor 20 may be expressed mathematically, as a product of the produced torque $T_e$ and the synchronous speed $\omega_e$, as $$p_e = T_e \omega_e \quad (4)$$

If the power loss in the system is $p_{loss}$ at this operating point, and the first voltage source 22 produces a power $p_1$ then the excess power that may flow to the second voltage source 24 may be expressed as $$p^* = p_1 - p_e - p_{loss} \quad (5)$$

This instantaneous, excess active power p* may be replaced for p in Equation 3 to calculate the synchronous frame voltage commands $v^*_{2\_d}$ and $v^*_{2\_q}$ at the second inverter 40 terminals as such:

$$\begin{bmatrix} v^*_{2\_d} \\ v^*_{2\_q} \end{bmatrix} = \begin{bmatrix} i_d & i_q \\ i_q & -i_d \end{bmatrix}^{-1} \begin{bmatrix} p^* \\ q^* \end{bmatrix} \quad (6)$$

Solving for the synchronous frame voltage commands yields $$v^*_{2\_d} = \frac{p^* i_d + q^* i_q}{i_d^2 + i_q^2} \quad (7)$$

$$v^*_{2\_q} = \frac{-p^* i_q + q^* i_d}{i_d^2 + i_q^2} \quad (8)$$

If the constant power line xy in FIGS. 3 and 4 represent constant active power p*, any point on this line (i.e., $a_1$, $a_2$, $a_3$ or $a_4$) may be selected as the operating point with different reactive power q* without altering the active power flow. Once the optimal location of the operating point is decided, the commanded value of instantaneous reactive power q* may be determined by the classical reactive power equation (Q) as mentioned earlier. The modified commanded active and reactive powers $P^*_b$ and $Q^*_b$ from of the power control block 64 may be used in place of p* and q* respectively in Equation 6 for calculating the modulating voltages at the second inverter 40 terminals.

Referring again to FIG. 5, a second inverter modulating voltage signal $v^*_{2\_dq}$ is sent from the power-to-voltage conversion block 66 to summation circuit 78 and directly to the second PWM block 70. Summation circuit 78 adds the voltage signal from summation circuit 76 to the second voltage inverter modulating voltage signal to generate a first inverter modulating voltage signal $v^*_{1\_dq}$, which is sent to the first PWM block 68.

The first and second PWM blocks 68 and 70, which may be within the electronic control system 18 (FIG. 1) and/or controller 34 (FIG. 2), utilize the modulating voltages signals $v^*_{1\_dq}$ and $v^*_{2\_dq}$ along with appropriate feedback signals, to generate PWM signals to operate the switches within the first and second inverters 38 and 40 to cause the desired output voltages to be applied across the windings 36 within the motor 20, shown in FIG. 2, to operate the motor 20. When there is an excess of voltage, or power, on the first inverter 38

(and/or first voltage source 22) side of the dual inverter system 32, power flows from the first voltage source 22, through the windings 36, and into the second voltage source 24. When there is a shortage of power on the first inverter 38 side of the system 32, power flows from the second voltage source 24 into the motor 20.

FIGS. 6-11 illustrate experimental results of the operation of the method and/or system 60 shown in FIG. 5. The waveforms in FIGS. 6-8 were developed with a zero reactive power command, while those in FIGS. 9-11 were developed with a reactive power command of 100 volt-amperes (VA). FIGS. 6 and 9 illustrate the DC current in the second voltage source 24. FIGS. 7 and 10 illustrate the voltage of the second voltage source 24, while FIGS. 8 and 11 illustrate one phase of the current in the motor 20. It should be noted that the DC current that represents the active power remains unaltered during a change in the commanded reactive power command, which confirms the decoupling nature of the power flow controller.

One advantage of the system and/or method described above is that the electrical system used to power the motor with two separate DC power sources is greatly simplified, as a conventional DC/DC power converter is not required. As a result, the overall cost and weight of the vehicle may be reduced. However, as the described above, the performance of the motor is not impaired as the commanded torque may still be generated within the motor, while allowing excess power to flow between the power sources.

Other embodiments may utilize system and method described above in different types of automobiles, different vehicles (e.g., watercraft and aircraft), or in different electrical systems altogether, as it may be implemented in any situation where the voltages of the two sources dynamically change over a wide range. The electric motor and the power inverter may have different numbers of phases, such as two or four. Other forms of power sources may be used, such as current sources and loads including diode rectifiers, thyristor converters, fuel cells, inductors, capacitors, and/or any combination thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating an electric motor having at least one winding coupled to first and second power supplies, comprising:
    receiving a torque command for the electric motor;
    determining a present power reserve for the first and second power supplies based at least in part on the torque command;
    determining an operating voltage for the second power supply based on the present power reserve; and
    applying the operating voltage for the second power supply to the at least one winding, the application of the operating voltage allowing the present power reserve to flow between at least two of the first power supply, the second power supply, and the motor.

2. The method of claim 1, wherein the determining of the present power reserve for the first and second power supplies comprises determining a power command for the first power supply based at least in part on the torque command.

3. The method of claim 2, wherein the present power reserve comprises at least one of the power command for the first power supply being less than a maximum power output of the first power supply and the power command not being less than the maximum power output of the first power supply.

4. The method of claim 3, wherein the determining of the operating voltage for the second power supply comprises determining a difference between the power command for the first power supply and the maximum power output of the first power supply.

5. The method of claim 4, wherein the determining of the operating voltage for the second power supply further comprises determining a power command for the second power supply based on the difference between the power command for the first power supply and the maximum power output of the first power supply.

6. The method of claim 5, wherein the determining of the operating voltage for the second power supply is further based on a product of the power command for the second power supply and a current command for the at least one winding.

7. The method of claim 6, wherein the at least one winding has first and second opposing ends and the operating voltage for the second power supply is applied at the second end of the winding.

8. The method of claim 7, further comprising:
    determining an operating voltage for the first power supply based at least in part on the operating voltage for the second power supply; and
    applying the operating voltage for the first power supply to the first end of the at least one winding.

9. The method of claim 8, wherein when the power command for the first power supply is less than the maximum power output of the first power supply, and the respective applications of the operating voltages for the first and second power supplies to the respective first and second ends of the at least one winding causes power to flow from the first power source to the second power source.

10. The method of claim 8, wherein when the power command for the first power supply is not less than the maximum power output of the first power supply, the respective applications of the operating voltages for the first and second power supplies to the respective first and second ends of the at least one winding causes power to flow from the second power source to the motor.

11. A method for operating an electric motor having at least one winding with a first direct current (DC) power supply and a first power inverter coupled to a first end thereof and a second DC power supply and a second power inverter coupled to a second end thereof, the method comprising:
    receiving a torque command for the electric motor;
    determining a power command for the first DC power supply based on the torque command, the power command for the first DC power supply being one of less than a maximum power output of the first DC power supply or not less than the maximum power output of the first DC power supply;
    determining a power command for the second DC power supply based on a difference between the power command for the first DC power supply and the maximum power output of the first DC power supply; and determining an operating voltage for the second DC power supply based on the power command for the second DC power supply applying the operating voltage for the second DC power supply to the at least one winding with the second power supply.

12. The method of claim 11, further comprising:

determining an operating voltage for the first DC power supply based on the torque command; and applying the operating voltage for the first DC power supply to the at least one winding with the first DC power supply, the applications of the respective operating voltages for the first and second DC power supplies to the at least one winding causing power to flow between the first and second DC power supplies and the motor.

13. The method of claim 12, wherein the first DC power supply is a fuel cell, the second DC power supply is a battery, and further comprising converting the DC power from the first and second DC power supplies to alternating current (AC) power before the applications of the respective operating voltages for the first and second DC power supplies to the at least one winding.

14. The method of claim 13, wherein the power command for the first DC power supply is less than the maximum power output of the first DC power supply and the applications of the respective operating voltages for the first and second DC power supplies to the at least one winding causes power to flow from the first DC power supply to the second DC power supply.

15. The method of claim 14, wherein the power command for the first DC power supply is not less than the maximum power output of the first DC power supply and the applications of the respective operating voltages for the first and second DC power supplies to the at least one winding causes power to flow from the second DC power supply to the motor.

16. An automotive drive system comprising:

an electric motor having at least one winding;

first and second direct current (DC) power supplies coupled to the at least one winding;

first and second power inverters coupled between the respective first and second DC power supplies and the at least one winding to receive DC power from the first and second DC power supplies and provide alternating current (AC) power to the electric motor;

a processor in operable communication with the electric motor, the first and second DC power supplies, and the first and second power inverters, the processor being configured to:

determine a present power reserve for the first and second DC power supplies based at least in part on a torque command for the electric motor;

determine an operating voltage for the second DC power supply based on the present power reserve; and operate the second power inverter to apply the operating voltage for the second power supply to the at least one winding with the second power supply.

17. The automotive drive system of claim 16, wherein the winding has first and second opposing ends, the first power inverter is electrically connected to the first end of the winding, and the second power inverter is electrically connected to the second end of the winding.

18. The automotive drive system of claim 17, wherein the first and second power inverters each comprise first and second switches and the at least one winding is electrically connected between the first and second switches of both the first and second power inverters.

19. The automotive drive system of claim 18, wherein the determining of the present power reserve for the first and second power supplies comprises determining a power command for the first power supply based at least in part on the torque command and wherein the determining of the operating voltage for the second power supply comprises:

determining a difference between the power command for the first power supply and the maximum power output of the first power supply; and determining a power command for the second power supply based on the difference between the power command for the first power supply and the maximum power output of the first power supply.

20. The automotive drive system of claim 19, wherein the determining of the operating voltage for the second power supply is further based on a product of the power command for the second power supply and a current command for at least one winding, the at least one winding has first and second opposing ends and the operating voltage for the second power supply is applied at the second end of the winding, and further comprising:

determining an operating voltage for the first power supply based at least in part on the operating voltage for the second power supply; and applying the operating voltage for the first power supply to the first end of the at least one winding.

* * * * *